United States Patent
Aoki et al.

(10) Patent No.: US 10,666,867 B2
(45) Date of Patent: May 26, 2020

(54) LENS BARREL, IMAGE PICKUP APPARATUS

(71) Applicant: OLYMPUS CORPORATION, Hachioji-shi, Tokyo (JP)

(72) Inventors: Shunsuke Aoki, Hachioji (JP); Yoshiaki Sueoka, Hachioji (JP)

(73) Assignee: OLYMPUS CORPORATION, Tokyo (JP)

(*) Notice: Subject to any disclaimer, the term of this patent is extended or adjusted under 35 U.S.C. 154(b) by 17 days.

(21) Appl. No.: 16/199,601

(22) Filed: Nov. 26, 2018

(65) Prior Publication Data
US 2019/0260935 A1 Aug. 22, 2019

(30) Foreign Application Priority Data
Feb. 19, 2018 (JP) ................................. 2018-026765

(51) Int. Cl.
| | | |
|---|---|---|
| *H04N 5/232* | (2006.01) | |
| *G02B 7/04* | (2006.01) | |
| *H04N 5/225* | (2006.01) | |
| *G02B 27/64* | (2006.01) | |

(52) U.S. Cl.
CPC .......... *H04N 5/23264* (2013.01); *G02B 7/04* (2013.01); *G02B 27/646* (2013.01); *H04N 5/2254* (2013.01)

(58) Field of Classification Search
CPC .......... H04N 5/23248; H04N 5/23264; H04N 5/23258; H04N 5/23261; H04N 5/23287; H04N 5/2328; H04N 5/23251; H04N 5/2253; H04N 5/2254; G02B 7/04; G02B 27/646; G02B 27/64
USPC ...................................................... 348/208.3
See application file for complete search history.

(56) References Cited

U.S. PATENT DOCUMENTS

| | | | | |
|---|---|---|---|---|
| 5,774,266 A | * | 6/1998 | Otani .................... | G02B 27/64 359/554 |
| 5,826,115 A | * | 10/1998 | Washisu ............... | G02B 27/646 396/55 |
| 5,973,319 A | * | 10/1999 | Washisu ............... | G02B 27/646 250/231.13 |
| 10,491,826 B2 | * | 11/2019 | Kim ....................... | G03B 5/02 |

(Continued)

FOREIGN PATENT DOCUMENTS

| | | | |
|---|---|---|---|
| JP | 2014164266 A | 9/2014 | |
| WO | WO-2009047761 A1 * | 4/2009 | ............... G01H 1/00 |

*Primary Examiner* — Chiawei Chen
(74) *Attorney, Agent, or Firm* — Holtz, Holtz & Volek PC (57) ABSTRACT

A lens barrel of the present invention includes an image stabilizer configured to correct image shake by driving optical devices, a ring-shaped electronic circuit board on which a pair of the acceleration sensors is arranged at each of positions facing each other with an optical axis of the image pickup optical system in between, and a lens barrel body in which at least the image pickup optical system, the image stabilizer, and the ring-shaped electronic circuit board are accommodated, and the ring-shaped electronic circuit board is fixed to the lens barrel body so as to be perpendicular to the optical axis of the image pickup optical system, and each of the positions where each of the pair of acceleration sensors is fixed is a position where each of the pair of acceleration sensors outputs a same signal when vibration other than camera shake is generated.

5 Claims, 3 Drawing Sheets

(56) References Cited

U.S. PATENT DOCUMENTS

| | | | |
|---|---|---|---|
| 2007/0041721 A1* | 2/2007 | Ito | H04N 5/23287 396/55 |
| 2007/0127904 A1* | 6/2007 | Iwasaki | G02B 7/102 396/55 |
| 2011/0007408 A1* | 1/2011 | Kurosawa | G02B 7/102 359/824 |
| 2012/0154614 A1* | 6/2012 | Moriya | G03B 3/10 348/208.5 |
| 2012/0218635 A1* | 8/2012 | Suzuka | H04N 5/2254 359/554 |
| 2014/0362242 A1* | 12/2014 | Takizawa | H04N 5/2252 348/208.11 |
| 2015/0219878 A1* | 8/2015 | Kim | H04N 5/2254 348/345 |
| 2015/0365568 A1* | 12/2015 | Topliss | H04N 5/2251 348/360 |
| 2018/0176470 A1* | 6/2018 | Kim | H04N 5/23254 |
| 2019/0004279 A1* | 1/2019 | Park | G02B 7/08 |
| 2019/0227339 A1* | 7/2019 | Park | H02K 33/18 |

* cited by examiner

LENS BARREL, IMAGE PICKUP APPARATUS

CROSS REFERENCE TO RELATED APPLICATION

This application claims the benefit of Japanese Application No. 2018-026765 filed in Japan on Feb. 19, 2018, the contents of which are incorporated herein by this reference.

BACKGROUND OF THE INVENTION

1. Field of the Invention

The present invention relates to a lens barrel including an image stabilizer and attached to a front surface of an image pickup apparatus body and the image pickup apparatus including the lens barrel.

2. Description of Related Art

Conventionally, an image pickup apparatus (such as a digital camera and a video camera) configured by including an image display device (such as a liquid crystal display (LCD) device or an organic electro-luminescence (OEL) display device) which sequentially photoelectrically converts an optical image forming by an image pickup optical system by using a photoelectric conversion device (hereinafter referred to as an image pickup device) such as a CCD (charge coupled device) image sensor and a CMOS (complementary metal oxide semiconductor) type image sensor, stores image signals obtained by the sequential photoelectric conversion as image data (such as digital image data expressing a still image or a movie) in a predetermined faun in a storage medium and displays the still image or the movie on the basis of the digital image data has been generally put into practice and has been widely adopted.

In the type of the image pickup apparatus, a so-called lens changeable image pickup apparatus including an image pickup device or a Focalplane type shutter mechanism inside the image pickup apparatus body and configured in such a manner that a lens barrel including a plurality of optical devices configuring an image pickup optical system is detachably attached on a front surface of the image pickup apparatus body is put into practice and widely used.

Moreover, in the type of lens changeable image pickup apparatus, an apparatus configured by including an image stabilizer configured to correct image shake caused by camera shake or the like has been put into practice.

The conventional image stabilizers include a so-called body built-in type or a sensor-shift type provided on an image pickup apparatus body side and corrects the image shake optically by driving the image pickup device and a so-called lens barrel built-in type or a lens-shift type provided on a lens barrel side and corrects the image shake optically by driving a part of the optical devices. Here, the sensor-shift type and the lens-shift type image stabilizers are called optical image stabilizers. Note that an image stabilizer of a type optically correcting the image shake by using both the sensor-shift type and the lens-shift type has been also put into practice.

The conventional lens barrel including the image stabilizer includes a lens barrel configured by having a plurality (two or more) of acceleration sensors for parallel shake detection in order to detect movement (that is, parallel shake) of an optical device in a plane orthogonal to an optical axis of an image pickup optical system. In the case of such configuration, the plurality of acceleration sensors are usually mounted on an electronic circuit board provided in the lens barrel. And the electronic circuit board is generally fixed to a fixing portion in the lens barrel by using a fixing member such as a screw.

In the conventional lens barrel having the configuration as above, vibration other than camera shake (such as vibration generated when a shutter mechanism provided in the image pickup apparatus body is operated) can be transmitted to the plurality of acceleration sensors on the electronic circuit board on the lens barrel side in some cases. In this case, the plurality of acceleration sensors erroneously detect the vibration other than camera shake as vibration caused by camera shake, and there is a concern that highly accurate camera shake correction performances cannot be obtained.

Thus, in the conventional lens barrel including the image stabilizer, when the electronic circuit board on which the plurality of acceleration sensors are mounted is to be fixed to the fixing portion in the lens barrel, various devises have been proposed to prevent transmission of the vibration other than camera shake to the plurality of acceleration sensors on the electronic circuit board by employing a floating structure through an impact absorbing member such as a rubber bush.

SUMMARY OF THE INVENTION

A lens barrel in an aspect of the present invention is a lens barrel including an image pickup optical system attached to an image pickup apparatus body and including a plurality of optical devices inside, including an image stabilizer configured to correct image shake by driving a part of the optical devices of the plurality of optical devices, a ring-shaped electronic circuit board on which a pair of acceleration sensors is arranged at each of positions facing each other with an optical axis of the image pickup optical system in between, and a lens barrel body in which at least the image pickup optical system, the image stabilizer, and the ring-shaped electronic circuit board are accommodated, and the ring-shaped electronic circuit board is fixed to the lens barrel body so as to be perpendicular to the optical axis of the image pickup optical system, and each of the positions where each of the pair of acceleration sensors is fixed is a position where each of the pair acceleration sensors outputs a same signal when vibration other than camera shake is generated in the image pickup apparatus body.

An image pickup apparatus in an aspect of the present invention includes an image pickup apparatus body which accommodates an image pickup device configured to receive an optical image formed by an image pickup optical system and to obtain an image signal and a Focalplane type shutter mechanism inside and a lens barrel which accommodates at least the image pickup optical system, an image stabilizer configured to correct image shake by driving a part of optical devices of a plurality of the optical devices configuring the image pickup optical system, and a ring-shaped electronic circuit board in which a pair of accelerator sensors is arranged at each of positions facing each other with an optical axis of the image pickup optical system in between inside and is attached to the image pickup apparatus body, and is attached to the image pickup apparatus body, the ring-shaped electronic circuit board is fixed to, the lens barrel so as to be perpendicular to the optical axis of the image pickup optical system, and each of the positions where the pair of acceleration sensors is fixed is a position where each of the pair of acceleration sensors outputs a same signal when vibration other than camera shake is generated in the image pickup apparatus body.

Advantages of the present invention will be made further apparent by detailed description below.

DETAILED DESCRIPTION OF THE PREFERRED EMBODIMENT

The present invention will be hereinafter described by an illustrated embodiment. Each figure used in the following description is schematic illustration, and dimensional relationships, scales and the like of each member are illustrated in a different way for each constituent element in some cases in order to illustrate each constituent element with a size that can be recognized on the figures. Therefore, the present invention is not limited only to the illustrated forms relating to a quantity of each constituent element, a shape of each constituent element, a ratio of the size of each constituent element, a relative position relationship of each constituent element or the like described in each figure.

An embodiment of the present invention is exemplification of application to an image pickup apparatus configured such that an optical image formed by an image pickup optical system configured by a plurality of optical devices is photoelectrically converted by using a solid image pickup device, for example, an image signal obtained by the photoelectric conversion is converted to digital image data representing a still image or a movie, generated digital data is stored in a storage medium, and the still image or the movie can be reproduced/displayed by an image display device on the basis of the digital image data recorded in the storage medium and a lens barrel attached to the image pickup apparatus.

Note that in the lens barrel in the embodiment, an optical axis of the image pickup optical system is represented by reference character O. In a direction along the optical axis O, a side facing a front surface of the lens barrel (that is, a side on which an object is located) is referred to as a front, and a side where the lens barrel is connected to the image pickup apparatus body (that is, a side where a mount member is located) is referred to as a rear.

EMBODIMENT

Figure 1:
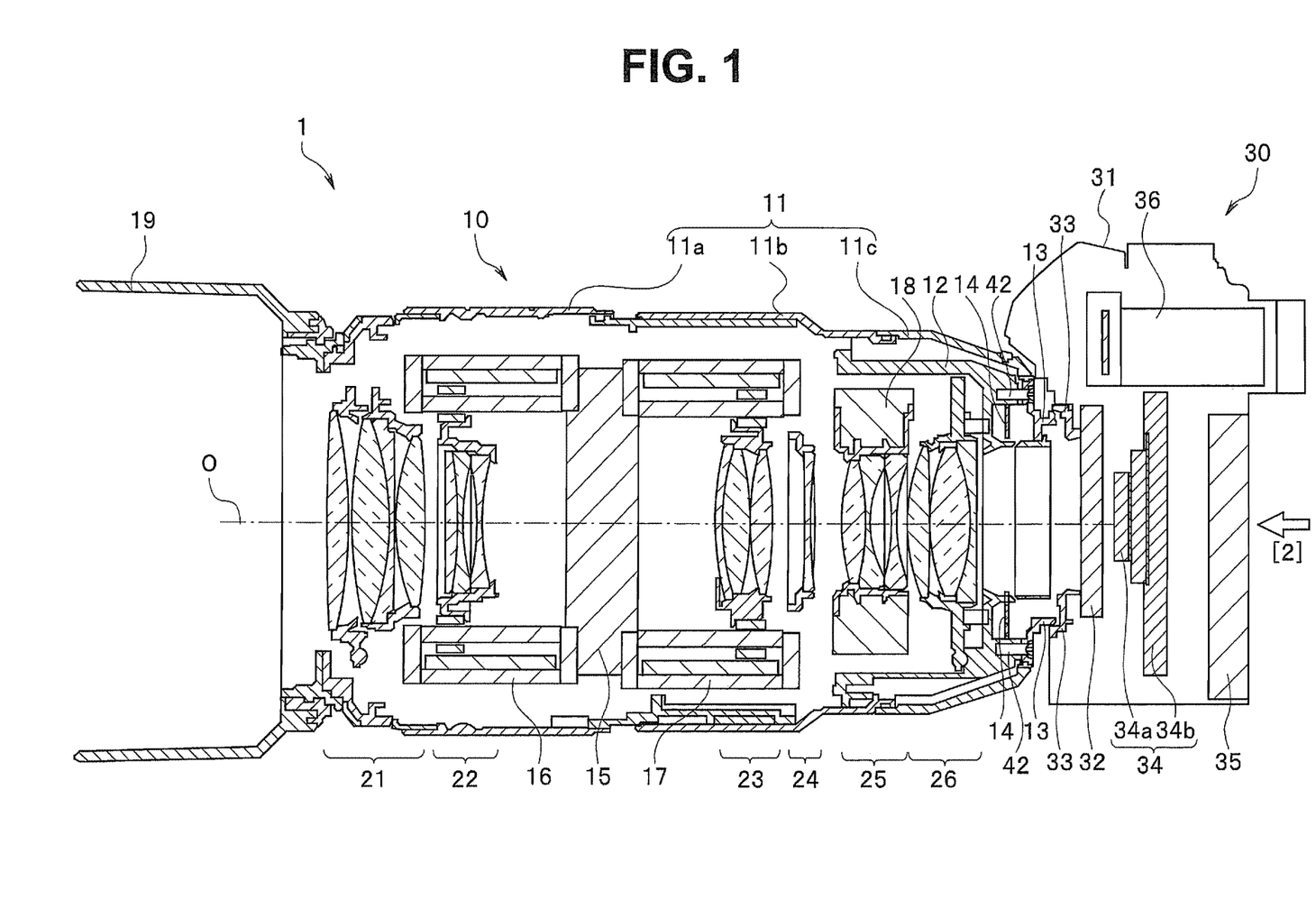
FIG. 1 is a schematic configuration diagram illustrating schematic configuration of an image pickup apparatus in a section to which a lens barrel of an embodiment of the present invention is attached.
Figure 2:
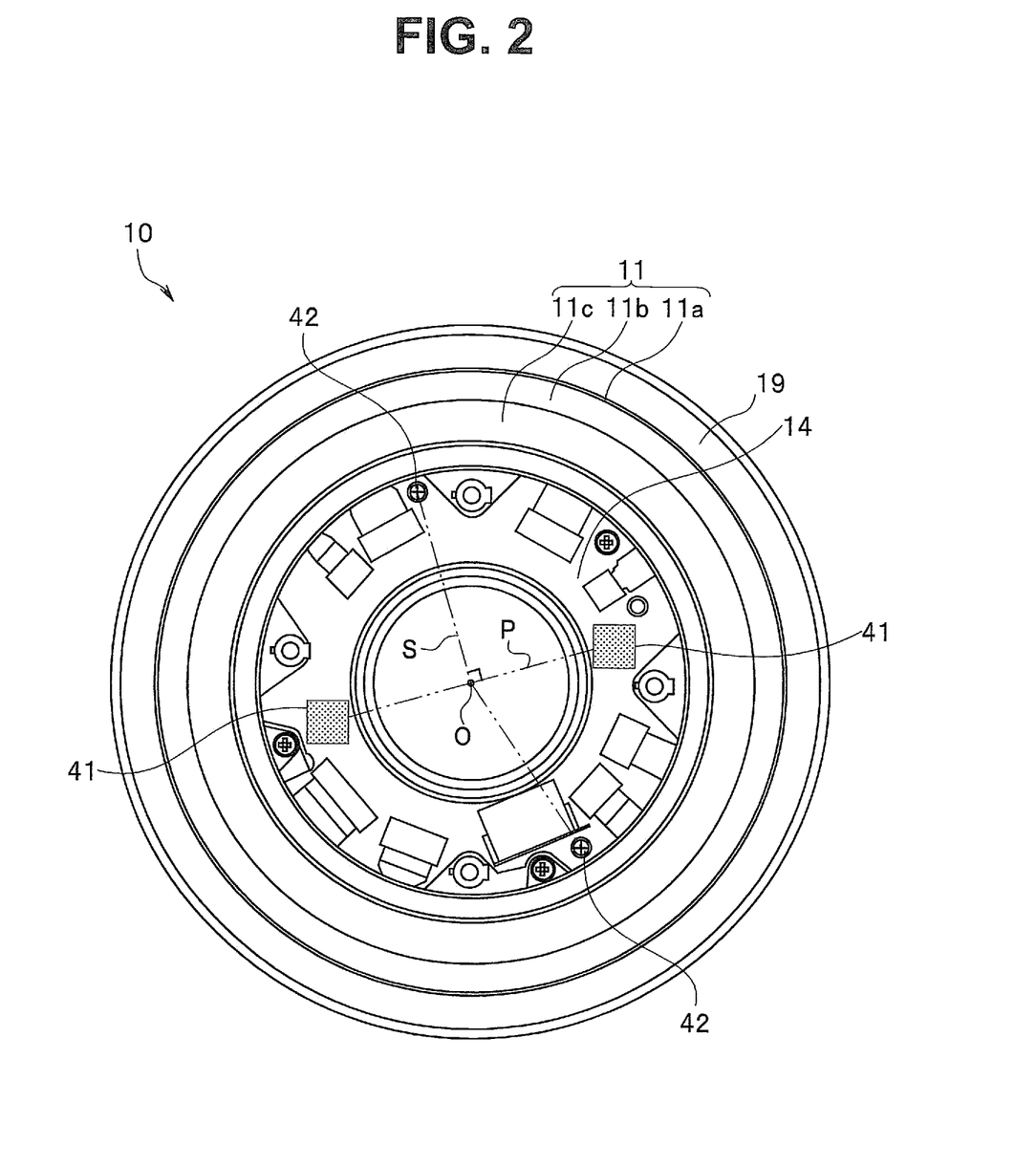
FIG. 2 is a plan view when seen in an arrow [2] direction in FIG. 1 in the lens barrel of the embodiment of the present invention.
Figure 3:
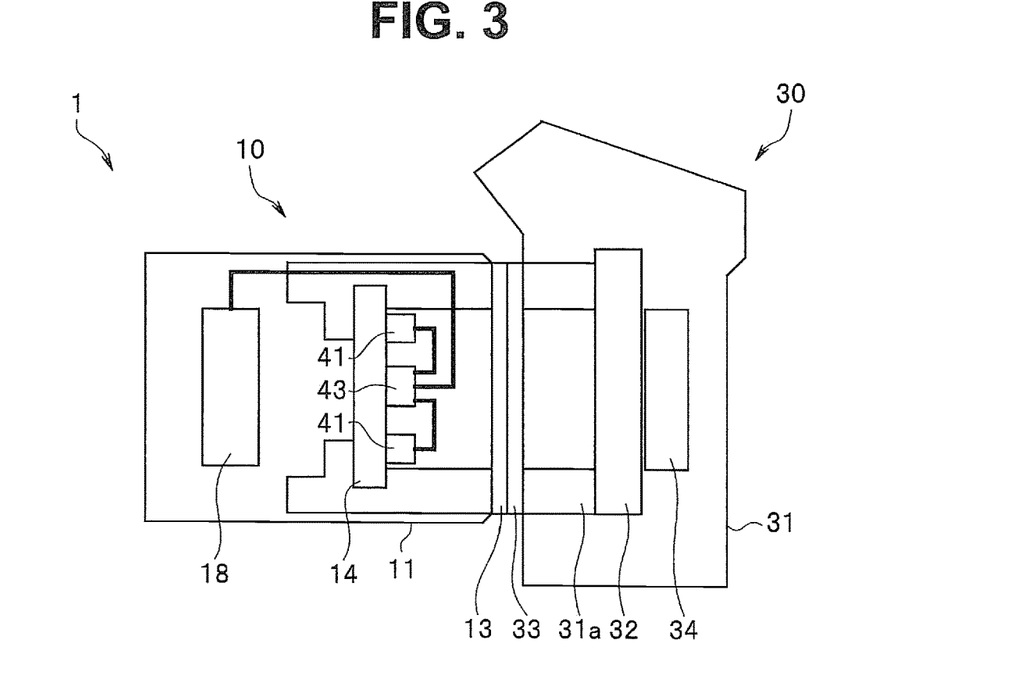
FIG. 3 is a block configuration diagram illustrating major components relating to a gist of the present invention (particularly an image stabilizer or the like) in the lens barrel of the embodiment of the present invention.
Figure 4:
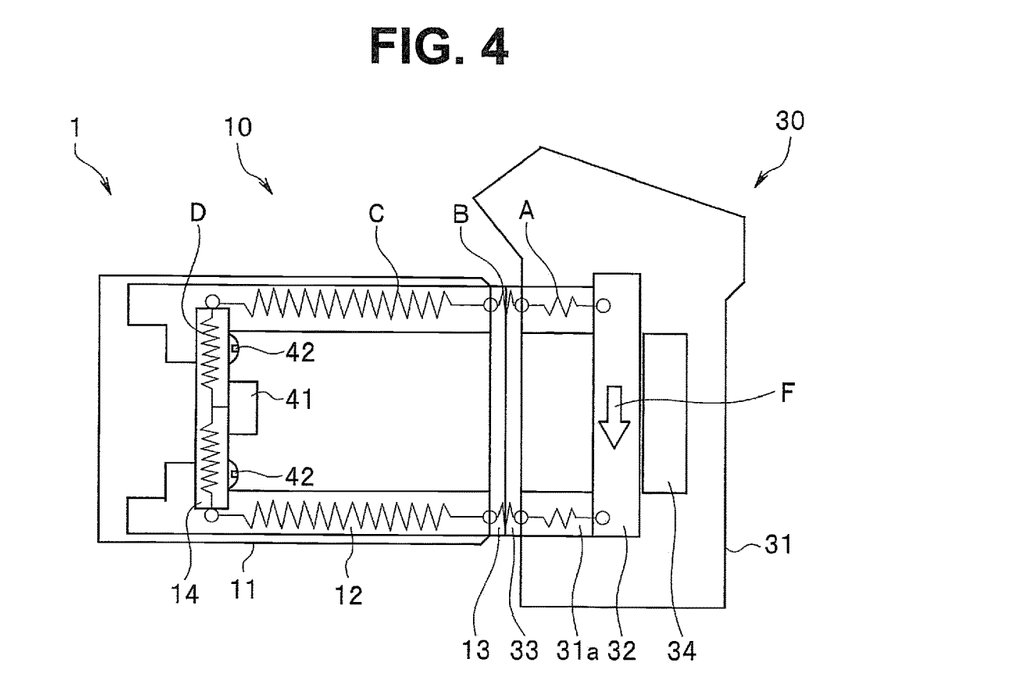
FIG. 4 is a view conceptually illustrating a state where vibration other than camera shake is transmitted from an image pickup apparatus body side to a lens barrel side in the lens barrel and the image pickup apparatus of the embodiment of the present invention.

FIG. 1 is a schematic configuration diagram illustrating schematic configuration of an image pickup apparatus in a section to which a lens barrel of an embodiment of the present invention is attached. FIG. 2 is a plan view when seen in an arrow [2] direction in FIG. 1 in the lens barrel of the embodiment. Note that in FIG. 2, a state where a mount member is removed is illustrated in order to illustrate an electronic circuit board provided inside the lens barrel and component arrangement arranged on the surface of the electronic circuit board (particularly arrangement of an acceleration sensor for detecting parallel shake and a fixing screw). FIG. 3 is a block configuration diagram illustrating major components relating to a gist of the present invention (particularly an image stabilizer or the like) in the lens barrel of the embodiment. FIG. 4 is a view conceptually illustrating a state where vibration other than camera shake is transmitted from an image pickup apparatus body side to a lens barrel side in the lens barrel and the image pickup apparatus of the embodiment.

First, schematic configuration of the image pickup apparatus to which the lens barrel of the embodiment of the present invention is attached will be described below by using mainly FIGS. 1 and 2.

The image pickup apparatus 1 of the embodiment is configured by a lens barrel 10 and an image pickup apparatus body 30.

The lens barrel 10 is configured mainly by a lens barrel body 11, a fixed cylinder member 12, a lens-side mount member 13, an electronic circuit board 14, an aperture mechanism 15, a second-group driving mechanism 16, a third-group driving mechanism 17, an image stabilizer 18, a lens hood 19, image pickup optical systems (21 to 26) and the like.

The lens barrel body 11 is an exterior member covering an outer surface of the lens barrel 10. The lens barrel body 11 is formed by combining a plurality of cylindrical members 11a, 11b, 11c, and the like. Note that the lens barrel body 11 in the embodiment is generally formed having a substantially cylindrical shape.

Various constituent units configuring the lens barrel 10 are accommodated in an internal space of the lens barrel body 11. Here, the constituent units accommodated in the internal space of the lens barrel body 11 include at least the image pickup optical system, the image stabilizer 18 and the ring-shaped electronic circuit board 14.

The fixed cylinder member 12 is a cylindrical member provided at a position close to the rear in the lens barrel body 11 and fixed to the lens barrel body 11. The lens-side mount member 13, the electronic circuit board 14, a sixth lens group 26 (which will be described later) which is a fixed lens group and the like are fixed to the fixed cylinder member 12.

The lens-side mount member 13 is a part of a connection mechanism configured to make the lens barrel 10 and the image pickup apparatus body 30 detachable. The lens-side mount member 13 is configured capable of bayonet connection with a body-side mount member 33 on the image pickup apparatus body 30 side which will be described later. Note that the connection mechanism by the lens-side mount member 13 and the body-side mount member 33 is configuration generally used in a conventional image pickup apparatus. Therefore, the detailed description will be omitted.

The electronic circuit board 14 is a ring-shaped electronic circuit board formed in a substantially annular shape. A plurality of electronic components are mounted on a surface of the electronic circuit board 14 at respective predetermined positions as illustrated in FIG. 2. Note that in FIG. 1, illustration of the plurality of electronic components mounted on the surface of the electronic circuit board 14 is omitted.

Here, the plurality of electronic components mounted on the electronic circuit board 14 include, in addition to a plurality of (a pair of two units in the embodiment) acceleration sensors 41 for parallel shake detection (see FIG. 2; not shown in FIG. 1), a processing unit (processor) such as a CPU (central processing unit) including a control circuit including various drivers relating to various types of operation control (focus driving control, aperture driving control, image stabilizing control and the like) of the lens barrel 10, a memory storing in advance various types of information (specific data such as a focal distance, an aperture value, and various aberration information) specific to the lens barrel 10, a calculation circuit 43 (see FIG. 3) configured to execute image stabilizing calculation processing and the like.

Here, the pair of acceleration sensors 41 in the electronic components mounted on the surface of the aforementioned electronic circuit board 14 will be described in detail.

A 3-axis acceleration sensor capable of measuring acceleration by one device in each axial direction of an X-axis, a Y-axis, and a Z-axis, for example, is used for each of the pair of acceleration sensors 41. The acceleration sensor 41 is an electronic component configured to detect parallel shake of the image pickup apparatus 1 (lens barrel 10). Here, the parallel shake refers to movement of the image pickup apparatus 1 (lens barrel 10) in a plane orthogonal to the optical axis O of the image pickup optical system.

Each acceleration sensor 41 is configured to detect an acceleration a on the basis of a displacement amount x of a spring by using a weight having a mass m supported by the spring with a spring constant k.

In this case, $$kx = ma \quad (1)$$

is established. Therefore, the equation (1) can be replaced by an equation (2) shown below. That is, $$a = kx/m \quad (2)$$

is established. And the acceleration a can be detected by the equation (2).

The acceleration sensor in the aforementioned form has conventionally and generally prevailed. The general form of the aforementioned type is assumed to be used for the acceleration sensor 41 applied to the embodiment.

The pair of acceleration sensors 41 is, as illustrated in FIG. 2, arranged at each of positions facing each other with the optical axis O of the image pickup optical system in between on the surface of the electronic circuit board 14. Note that a two-dot chain line indicated by reference character P in FIG. 2 is a virtual line connecting the pair of acceleration sensors 41 passing through the optical axis O. In the embodiment, arrangement of the pair of acceleration sensors 41 is determined so that the virtual line P becomes substantially linear.

Each output signal from the pair of acceleration sensors 41 is, as illustrated in FIG. 3, inputted into the one calculation circuit 43 of the processing unit (processor) mounted on the electronic circuit board 14, for example, and predetermined calculation processing (image stabilizing calculation processing) is executed in the calculation circuit 43. A calculation result is outputted to an image stabilizing control circuit (not shown) included in the image stabilizer 18 and contributes to better driving control in the image stabilizer 18.

And a result of execution of the image stabilizing driving control by the image stabilizer 18 is again detected by the acceleration sensor 41 for parallel shake detection, and feedback control is executed.

The electronic circuit board 14 will be described in more detail. The electronic circuit board 14 is a printed circuit board (PWB; printed wiring board; PCB; printed circuit board) formed by printing an electronic circuit. The electronic circuit board 14 is a rigid substrate formed in a flat plate shape with a thickness of approximately 1 mm, for example, by using a rigid insulating body (specifically, an epoxy material with glass or the like), for example. In this case, the electronic circuit board 14 is generally formed having a substantially annular shape as described above.

The electronic circuit board 14 is fixed by using a plurality of fixing screws 42, for example, to the fixed cylinder member 12 inside the lens barrel body 11 so as to be perpendicular to the optical axis O of the image pickup optical system. Note that in the embodiment, the electronic circuit board 14 illustrates a configuration example of fixation using two pieces of the fixing screws 42 as illustrated in FIG. 2.

As described above, by arranging the electronic circuit board 14 perpendicularly to the optical axis O and by forming the electronic circuit board 14 in a ring shape, the electronic circuit board 14 does not shield a light flux passing through the image pickup optical system. Moreover, the rigid electronic circuit board 14 can be arranged efficiently inside the lens barrel 10 having a cylindrical shape.

The aperture mechanism 15 is a mechanism unit configured to adjust a light amount passing through the image pickup optical system. An aperture mechanism 15 generally applied in a conventional image pickup apparatus is used. Therefore, detailed illustration and description on components will be omitted.

The image pickup optical systems (21 to 26) are constituent units configured to form an optical image of the object by collecting reflection light from the object. The image pickup optical system is configured by a plurality of optical devices (lenses) and a plurality of lens holding members which hold each of the optical devices by a predetermined lens group and the like.

The image pickup optical system of the embodiment is configured specifically by six lens groups, that is, the first lens group 21, the second lens group 22, the third lens group 23, the fourth lens group 24, the fifth lens group 25, and the sixth lens group 26. Among them, the first lens group 21 and the sixth lens group 26 are fixed lens groups fixed inside the lens barrel body 11.

The second lens group 22, the third lens group 23, the fourth lens group 24, and the fifth lens group 25 are movable lens groups moving in a predetermined direction inside the lens barrel body 11. Among them, the second lens group 22, the third lens group 23, and the fourth lens group 24 are focus lens groups which contribute to a focus adjustment operation by moving as appropriate in a direction along the optical axis O. The fifth lens group 25 is an image stabilizing lens group which contributes to an image stabilizing operation by moving as appropriate in the plane orthogonal to the optical axis O.

The second-group driving mechanism 16 is a lens group driving mechanism configured to drive the second lens group 22 in the direction along the optical axis O during the focus adjustment operation. Similarly, the third-group driving mechanism 17 is a lens group driving mechanism configured to drive the third lens group 23 in the direction along the optical axis O during the focus adjustment operation. Note that the focus adjustment operation is not directly related to the present invention and thus, detailed description on the lens moving mechanisms (16, 17) relating to the focus adjustment operation will be omitted.

The image stabilizer 18 is a constituent unit including a lens group driving mechanism configured to move the fifth lens group 25 in the plane orthogonal to the optical axis O during the image stabilizing operation. The image stabilizer 18 configures a part of the lens-shift type image stabilizer. Note that the image stabilizing operation itself is not directly related to the present invention and thus, details of the image stabilizer 18 will be omitted.

The lens hood 19 is an accessory member attached to a front end portion of the lens barrel 10. The lens hood 19 has a role of shielding incidence of harmful light not required for formation of an object image in the light flux incident to the image pickup optical system and of preventing occurrence of lens flare or the like. Moreover, the lens hood 19 also has a role of relaxing an impact or the like from an external force to the lens barrel 10.

The lens barrel 10 is configured as above. Note that the lens barrel 10 has various constituent members other than the above, but since the constituent members are not directly related to the present invention, illustration and description of the constituent members will be omitted.

The image pickup apparatus body 30 is mainly configured by a body housing 31, various constituent units (such as a shutter mechanism 32, an image pickup unit 34, a display unit 35, and a finder unit 36) accommodated inside the body housing 31, the body-side mount member 33 and the like.

The body housing 31 is formed in a hollow box shape and accommodates various constituent units (such as the shutter mechanism 32, the image pickup unit 34, the display unit 35, and the finder unit 36) in the internal space.

An opening which exposes a light receiving surface of the image pickup device 34a (which will be described later) to an outside is provided on a front surface of the body housing 31. The body-side mount member 33 is fixed to a periphery portion of the opening. The body-side mount member 33 is another part of a connecting member which enables the image pickup apparatus body 30 and the lens barrel 10 to be detachable. As a result, the lens barrel 10 is configured to be attached to the front surface of the body housing 31 of the image pickup apparatus body 30.

The shutter mechanism 32 is a constituent unit configured to adjust an exposure time period to the light receiving surface of the image pickup device 34a (which will be described later). The shutter mechanism 32 itself is fixed to a fixing portion 31a (which will be described later; not shown in FIG. 1 or 2; see FIGS. 3 and 4) inside the body housing 31 of the image pickup apparatus body 30.

As the shutter mechanism 32 in the image pickup apparatus 1 (the image pickup apparatus body 30) in the embodiment, a Focalplane type shutter mechanism, for example, is applied. Configuration generally applied in a conventional image pickup apparatus is assumed to be used for configuration of the shutter mechanism 32 itself, and detailed illustration and description of components will be omitted and brief description will be given below.

The Focalplane type shutter mechanism 32 is provided on a front surface side of the light receiving surface of the image pickup device 34a which will be described later, and a light-shielding film member with a gap formed is configured to give exposure to the light receiving surface by running in an up-and-down direction or in a right-and-left direction of the body housing 31. In this case, the running of the light-shielding film member of the shutter mechanism 32 is carried out by using a charged force of a biasing member such as a spring.

That is, the shutter mechanism 32 is configured such that a charged biasing force of the spring receives a release operation by a user and is opened, whereby the light shielding film member runs at a high speed and after that, the light shielding film member is suddenly stopped at a predetermined position. Therefore, it is known that large vibration occurs during the operation.

The image pickup unit 34 is a constituent unit configured to generate and to obtain an image signal of an object image. Thus, the image pickup unit 34 is configured by the image pickup device 34a, an image pickup substrate 34b and the like.

The image pickup device 34a is a photoelectric conversion device which receives light of an object image optically formed by the image pickup optical system, sequentially converts the object image to an image signal and obtains image data in a predetermined form. A CCD image sensor or a CMOS type image sensor, for example, is applied for the image pickup device 34a.

The image pickup substrate 34b is an electronic circuit board having an image pickup circuit or the like including a driving circuit which drives the image pickup device 34a, a signal processing circuit or the like which receives the image signal obtained by the image pickup device 34a and executes predetermined signal processing or the like. For the image pickup substrate 34b, for example, a rigid substrate formed in a flat plate shape by using a rigid insulator (an epoxy material with glass, for example) can be applied or the image pickup substrate 34b may be configured by using a flexible printed circuit (FPC) board formed by using a thin-film insulator having flexibility (a plastic material, for example).

The display unit 35 is a constituent unit configured to display not only an image based on image data obtained by the image pickup unit 34 but also a setting operation screen (menu display) for various setting in the image pickup apparatus 1 and the like. The display unit 35 is configured by a display panel and driving circuits of the display panel and the like.

The finder unit 36 is a constituent unit having a function substantially similar to the aforementioned display unit 35 and is a so-called electronic view finder (EVF) including a display panel smaller in size than the aforementioned display unit 35.

Note that an image pickup unit, a display unit, and a finder unit generally applied in the conventional image pickup apparatus are used also for each of the image pickup unit 34, the display unit 35, and the finder unit 36. Therefore, description on the detailed components will be omitted.

The image pickup apparatus body 30 is configured as above. Note that the image pickup apparatus body 30 also has various constituent members other than the constituent members described above, but since the constituent members are not directly related to the present invention, illustration and description will be omitted.

In the image pickup apparatus 1 configured by the lens barrel 10 and the image pickup apparatus body 30 as above, the image pickup apparatus 1 is configured by providing the shutter mechanism 32 inside the image pickup apparatus body 30 as described above. The Focalplane type shutter mechanism is employed as the shutter mechanism 32.

In this case, the Focalplane type shutter mechanism 32 is known to generate vibration during an operation due to the structure. The vibration is likely to be transmitted to each constituent unit in the image pickup apparatus 1. If the vibration from the shutter mechanism 32 (that is, vibration other than camera shake) is transmitted particularly to the acceleration sensor 41 configured to detect parallel shake of the image pickup apparatus 1 (lens barrel 10), for example, in the constituent portions related to the image stabilizer, it is known that the transmission causes drop in image stabilization accuracy.

Here, in the image pickup apparatus in a form illustrated in FIG. 1, a state where the vibration other than camera shake (vibration generated in the shutter mechanism 32, for example) is transmitted from the image pickup apparatus body 30 side to the lens barrel 10 side and is finally transmitted to the acceleration sensor 41 on the electronic circuit board 14 will be described below by using FIG. 4.

As described above, the shutter mechanism 32 is fixed to the fixing portion 31a inside the body housing 31 of the image pickup apparatus body 30. The fixing portion 31a is integrally configured with the body housing 31 by being fixed to the body housing 31.

The body-side mount member 33 is fixed to the periphery portion of the front surface opening of the body housing 31. Therefore, in this configuration, the vibration generated in the shutter mechanism 32 is transmitted from the shutter mechanism 32 to the body-side mount member 33 through the fixing portion 31a (see reference character A in FIG. 4).

Note that the arrow reference character F indicated in FIG. 4 indicates a direction of the vibration generated when the shutter mechanism 32 is operated. If the shutter mechanism 32 is a vertically-running Focalplane type shutter mechanism, for example, the light-shielding film member runs from an upper side to a lower side of the image pickup apparatus body 30. The arrow reference character F in FIG. 4 indicates a running direction of the light-shielding film member at this time.

Subsequently, the body-side mount member 33 is fixed by bayonet-connection so that the body-side mount member 33 is integrated with the lens-side mount member 13. This configuration allows the vibration generated in the shutter mechanism 32 and transmitted to the body-side mount member 33 through the fixing portion 31a to be transmitted to the lens-side mount member 13 (see reference character B in FIG. 4).

The lens-side mount member 13 is fixed to the fixed cylinder member 12 fixed to the inside of the lens barrel body 11. This configuration allows the vibration generated in the shutter mechanism 32 and transmitted to the lens-side mount member 13 through the body-side mount member 33 to be transmitted to the fixed cylinder member 12 (see reference character C in FIG. 4).

The electronic circuit board 14 is fixed to the fixed cylinder member 12 by the two fixing screws 42. And a pair of the acceleration sensors 41 is mounted (fixed) to the electronic circuit board 14. This configuration allows the vibration generated in the shutter mechanism 32 and transmitted to the fixed cylinder member 12 through the fixing portion 31a, the body-side mount member 33, and the lens-side mount member 13 to be transmitted to each of the pair of acceleration sensors 41 through the electronic circuit board 14 (see reference character D in FIG. 4).

As described above, the vibration other than camera shake generated in the constituent unit (the shutter mechanism 32) in the image pickup apparatus body 30 can be transmitted to the lens barrel 10 easily.

In this case, the electronic circuit board 14 is fixed to the fixed cylinder member 12 by using the two fixing screws 42. Arrangement of each of the fixing screws 42 at this time is arranged in each of regions facing the optical axis O in between as illustrated in FIG. 2.

In the embodiment, the two fixing screws 42 are provided at fixed positions at two spots on a virtual line S perpendicular to the virtual line P (see FIG. 2) passing through the optical axis O and connecting the pair of acceleration sensors 41.

That is, the embodiment is configured such that the pair of acceleration sensors 41 and the two fixing screws 42 are arranged at positions separated by a rotation angle of approximately 90 degrees around the optical axis O on the surface of the ring-shaped electronic circuit board 14, respectively. In this case, a relative position relationship among the pair of acceleration sensors 41 and the two fixing screws 42 can allow a shift in a range of an assembling error (approximately ±5 degrees of the rotation angle around the optical axis O, for example). In an example illustrated in FIG. 2, the virtual line S connecting each of the two fixing screws 42 and passing through the optical axis O is not linear, but an example in which the virtual line S is arranged at a position slightly shifted from an assumed straight line.

As described above, in the image pickup apparatus 1 configured with the determined position relationship among the pair of acceleration sensors 41 and the two fixing screws 42, when the vibration other than camera shake is generated, substantially the same signals are outputted from the pair of acceleration sensors 41. Therefore, an influence of the vibration other than camera shake on the pair of acceleration sensors 41 can be prevented by having such configuration.

As described above, according to the aforementioned embodiment, the lens barrel 10 including the image pickup optical system inside configured by a plurality of optical devices attached to the image pickup apparatus body 30 includes the image stabilizer 18 configured to stabilize an image by driving a part of the optical devices of the plurality of optical devices, the ring-shaped electronic circuit board 14 in which the pair of acceleration sensors 41 is arranged at each of the positions facing each other with the optical axis O of the image pickup optical system in between, and the lens barrel body 11 accommodating at least the image pickup optical system, the image stabilizer 18, and the ring-shaped electronic circuit board 14, the ring-shaped electronic circuit board 14 is fixed to the lens barrel body 11 so as to be perpendicular to the optical axis O of the image pickup optical system, and each of the positions to which the pair of acceleration sensors 41 is fixed is determined such that, when the vibration other than camera shake (vibration generated in the Focalplane type shutter mechanism 32 disposed in the image pickup apparatus body 30) is generated in the image pickup apparatus body 30, each of the pair of acceleration sensors 41 outputs the same signal.

In this case, the positions where the ring-shaped electronic circuit board 14 is fixed to the fixed cylinder member 12 of the lens barrel body 11 are fixed positions at two spots on the virtual line S perpendicular to the virtual line P passing through the optical axis O of the image pickup optical system and connecting the pair of acceleration sensors 41. Here, the ring-shaped electronic circuit board 14 is fixed to the fixed cylinder member 12 of the lens barrel body 11 by using the two fixing screws 42.

Because of such configuration, each of the output signals from the pair of acceleration sensors 41 can be made identical in the lens barrel 10 of the embodiment and the image pickup apparatus 1 to which the lens barrel 10 is attached.

Therefore, the influence of the vibration generated in the shutter mechanism 32 provided inside the image pickup apparatus body 30 on the pair of acceleration sensors 41 for parallel shake detection can be prevented.

As a result, according to the configuration of the embodiment, detection by the pair of acceleration sensors 41, that is, detection of the parallel shake of the image pickup apparatus 1 (lens barrel 10) can be made with higher accuracy. Therefore, this helps to improve the image stabilization effect by the image stabilizer 18 of the lens barrel 10.

Moreover, since the electronic circuit board 14 on which the pair of acceleration sensors 41 is mounted is formed in a ring shape, a sectional area of the electronic circuit board 14 can be made smaller. The smaller the sectional area of the electronic circuit board 14 is, the more flexibility the electronic circuit board can obtain. If the electronic circuit board 14 has flexibility, a spring constant can be made smaller and thus, less transmission of vibration other than camera shake can be made. As a result, a distance between the acceleration sensor 41 and the fixing screw 42 no longer has to be large, which helps to reduce the size of the lens barrel 10.

Note that in the aforementioned embodiment, the so-called lens changeable image pickup apparatus and the lens barrel for replacement to be attached to the image pickup apparatus are described as an example, but the lens barrel and the image pickup apparatus to which the present invention can be applied are not limited only to the form. For example, the present invention can be also applied totally similarly to a so-called lens-integrated type image pickup apparatus of a form in which the lens barrel is integrally mounted on the front surface of the image pickup apparatus body.

The present invention is not limited to the aforementioned embodiment but is naturally capable of various modifications and applications within a range not departing from a gist of the invention. Moreover, the aforementioned embodiment includes various stages of the invention, and the various inventions can be extracted by appropriate combinations of a plurality of disclosed constituent requirements. For example, even if some constituent requirements are deleted from all the constituent requirements illustrated in the aforementioned embodiment, the configuration with the constituent requirements deleted can be extracted as the invention as long as the problem to be solved by the invention can be solved and the effect of the invention can be obtained. Furthermore, the constituent elements across the different embodiments may be combined as appropriate. The present invention is not restricted by a specific embodiment except limitation by appended claims.

What is claimed is:

1. A lens barrel including an image pickup optical system attached to an image pickup apparatus body and including a plurality of optical devices inside, comprising:
   an image stabilizer configured to correct image shake by driving a part of the optical devices of the plurality of optical devices;
   a ring-shaped electronic circuit board on which a pair of acceleration sensors is arranged at each of positions facing each other with an optical axis of the image pickup optical system in between; and
   a lens barrel body in which at least the image pickup optical system, the image stabilizer, and the ring-shaped electronic circuit board are accommodated, wherein
   the ring-shaped electronic circuit board is fixed to the lens barrel body so as to be perpendicular to the optical axis of the image pickup optical system; and
   each of the positions where each of the pair of acceleration sensors is fixed is a position where each of the pair of acceleration sensors outputs a same signal when vibration other than camera shake is generated in the image pickup apparatus body.

2. The lens barrel according to claim 1, wherein vibration other than camera shake generated in the image pickup apparatus body is vibration generated in a Focalplane type shutter mechanism disposed in the image pickup apparatus body.

3. The lens barrel according to claim 2, wherein positions where the ring-shaped electronic circuit board is fixed to the lens barrel body are fixed positions at two spots on a virtual line perpendicular to a virtual line passing through the optical axis of the image pickup optical system and connecting the pair of acceleration sensors.

4. The lens barrel according to claim 3, wherein the ring-shaped electronic circuit board is fixed to a fixing portion of the lens barrel body by using two screws.

5. An image pickup apparatus comprising:
   an image pickup apparatus body which accommodates an image pickup device configured to receive an optical image formed by an image pickup optical system and to obtain an image signal and a Focalplane type shutter mechanism inside; and
   a lens barrel which accommodates at least the image pickup optical system, an image stabilizer configured to correct image shake by driving a part of optical devices of a plurality of the optical devices configuring the image pickup optical system, and a ring-shaped electronic circuit board in which a pair of accelerator sensors is arranged at each of positions facing each other with an optical axis of the image pickup optical system in between inside and is attached to the image pickup apparatus body, wherein
   the ring-shaped electronic circuit board is fixed to the lens barrel so as to be perpendicular to the optical axis of the image pickup optical system; and
   each of the positions where the pair of acceleration sensors is fixed is a position where each of the pair of acceleration sensors outputs a same signal when vibration other than camera shake is generated in the image pickup apparatus body.

* * * * *